Jan. 23, 1923.
L. SCHNEIDER.
LEVER GRIP.
FILED MAY 26, 1921.
1,442,830
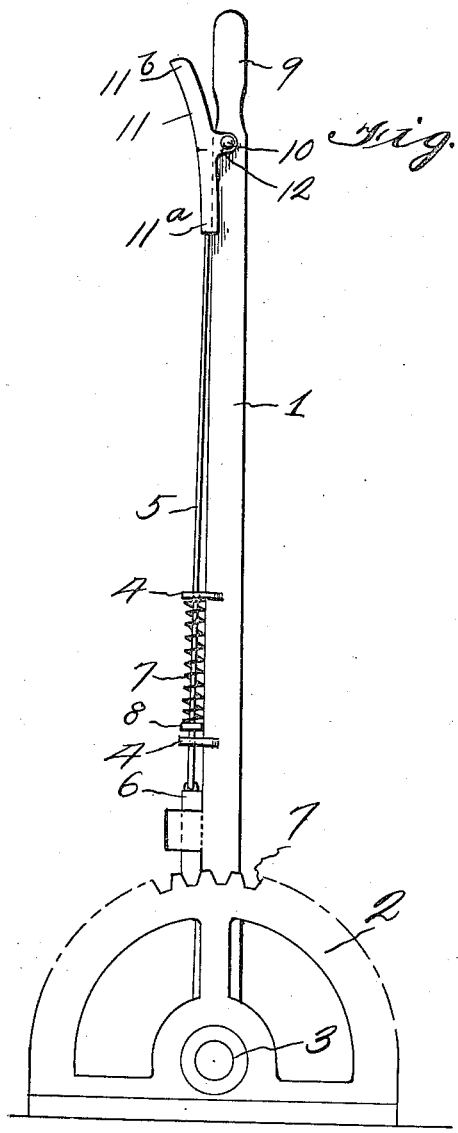
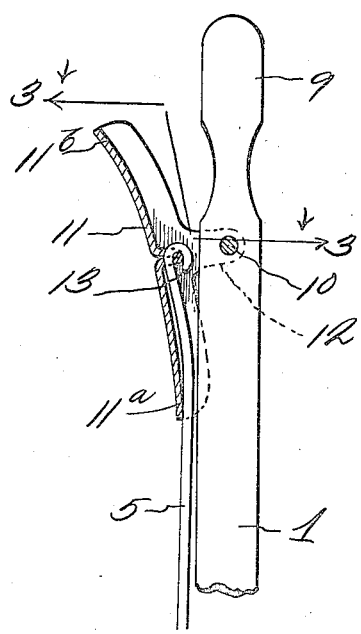
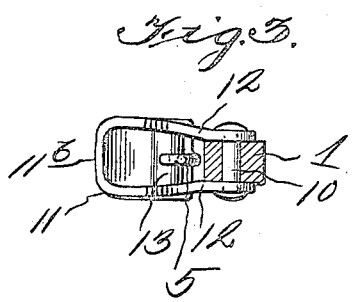
Inventor
L. Schneider
By D. Swift
Attorney Patented Jan. 23, 1923.

1,442,830

UNITED STATES PATENT OFFICE.

LOUIS SCHNEIDER, OF CLINTON, MISSOURI.

LEVER GRIP.

Application filed May 26, 1921. Serial No. 472,683.

*To all whom it may concern:*

Be it known that I, LOUIS SCHNEIDER, a citizen of the United States, residing at Clinton, in the county of Henry, State of Missouri, have invented a new and useful Lever Grip; and I do hereby declare the following to be a full, clear, and exact description of the invention, such as will enable others skilled in the art to which it appertains to make and use the same.

The invention relates to lever grips used in connection with preferably heavy machinery and has for its object to provide a grip pivotally secured to a lever at a point substantially centrally of the grip, thereby allowing during a lever operation, fingers of the operator to be disposed above and below the pivotal point of the grip so that the operator will have complete control of the lever and the load will be disposed on the pivotal point of the grip at a point substantially centrally of the fingers.

A further object is to provide a lever grip comprising an elongated finger engaging member having rearwardly extending integral ears substantially centrally thereof and adapted to receive therebetween a lever and be pivotally connected thereto, and to provide a struck in lug substantially centrally of the grip to which lug a detent connecting rod may be pivotally connected.

With the above and other objects in view the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:—

Figure 1 is a side elevation of a conventional form of lever, showing the grip applied thereto.

Figure 2 is an enlarged detail view of the upper end of the lever showing the grip in vertical section.

Figure 3 is a horizontal sectional view taken on line 3—3 of Figure 2.

Referring to the drawings, the numeral 1 designates a conventional form of operating lever and 2 the segmental rack to which said lever is connected as at 3. Slidably mounted in lugs 4 carried by the lever 1 is a connecting rod 5, the lower end of which rod is connected to a detent 6 which cooperates with the teeth 7 of the segmental rack 2. The detent 6 is normally held downwardly by means of a coiled spring 7 which is interposed between the upper lug 4 and the collar 8 carried by the connecting rod. The above mechanism set forth for illustrative purposes only and it is to be understood that the gripping device hereinafter described and claimed may be used in connection with any form of lever to which it is applicable.

Pivotally connected to the lever 1 adjacent the handle member 9 by means of a pin 10 is a rockable grip 11, which grip is pivoted to the lever 1 by the pin 10 which passes through the integral ears 12 disposed substantially centrally of the grip 11. When the operator grasps the handle member 9 and the grip 11, it will be seen that the fingers of the operator will be disposed above and below the pivotal pin 10 and consequently the load will be carried on said pivotal pin thereby allowing the operator to completely control said lever during its movement and at the same time when the operator imparts a pull on the lever the load will be carried centrally of the operator's hand, thereby obviating slipping of the hand on the grip which is common in grips now in use which are pivoted at one end and the fingers of the operator consequently are disposed above said pivotal point and positions where they will easily slip when a pull is imparted on the lever. The upper end of the connecting rod 5 is pivotally connected to a struck in ear 13 carried by the grip 11 at a point substantially centrally thereof, and adjacent the pivotal pin 10. It will be seen that when the operator grasps the lever and the grip 11 that said grip will be rocked on the pivotal point 10 so that its lower end 11$^a$ will move outwardly at the same time that its upper end 11$^b$ will move inwardly. The rocking action will impart a pull on the connecting rod 5 thereby raising the detent 6 out of engagement with the teeth 7 of the segmental rack 2, at which time the load which the lever may be carrying will be balanced on the pivot pin 10 in such a manner that the load is centrally disposed in the operator's hand during a lever pulling operation.

From the above it will be seen that a lever grip is provided which is simple in construction and one so constructed that during a lever pulling operation the load will be so distributed that the danger of slipping of the grip within the hand is obviated.

The invention having been set forth what is claimed as new and useful is:—

The combination with a lever having a pawl operating connecting rod thereon, of a hand engaging grip carried by said lever, said hand engaging grip being provided with rearwardly extending ears, a pivotal bolt extending through said ears and through the lever and forming a pivotal point for the grip, said ears being disposed substantially centrally of the grip, a transversely disposed inwardly extending and inwardly struck integral lug carried by the grip substantially centrally thereof, to which lug the connecting rod is pivotally connected.

In testimony whereof I have signed my name to this specification in the presence of two subscribing witnesses.

LOUIS SCHNEIDER.

Witnesses:
T. A. ROBERTS,
J. C. FERRY.